United States Patent [19]

Morrissey

[11] Patent Number: 5,041,816
[45] Date of Patent: Aug. 20, 1991

[54] FREEZER ALARM SYSTEM WITH TWO SENSOR MODELS

[76] Inventor: Robert L. Morrissey, 10 Harold Rd., Farmington, Conn. 06032

[21] Appl. No.: 558,562

[22] Filed: Jul. 26, 1990

[51] Int. Cl.⁵ .................................................. G08B 21/00
[52] U.S. Cl. .................................. 340/585; 116/101; 337/298; 337/332
[58] Field of Search ................ 340/585, 590; 337/298, 337/332; 116/106, 103, 101

[56] References Cited

U.S. PATENT DOCUMENTS

| | | | |
|---|---|---|---|
| 856,162 | 6/1907 | Kitsee | 340/590 |
| 2,067,440 | 1/1937 | Finney | 165/11.1 |
| 2,387,313 | 10/1945 | Wilson | 200/190 |
| 2,433,024 | 12/1947 | Burgess | 340/590 |
| 3,626,128 | 12/1971 | Du Rocher et al. | 200/194 |
| 3,959,787 | 5/1976 | Messmann | 340/585 |
| 4,011,552 | 3/1977 | Quirke | 340/585 |
| 4,144,532 | 3/1979 | Boyd | 340/585 |
| 4,325,059 | 4/1982 | Jaye | 340/585 |
| 4,855,721 | 8/1989 | Hallett et al. | 340/585 |

Primary Examiner—Glen R. Swann, III

[57] ABSTRACT

A freezer alarm system is energized by a battery (2) or an AC power adapter (3) to drive a piezo alert pulsing buzzer (4) when activated by one of two sensor modules. An electrolyte freezer alarm sensor (13) has a non-conducting wall (9) and two conducting elements (9), and it contains electrolyte solution (10) and a small air expansion space (11). Alternatively, a modified mercury switch freezer alarm sensor has non-conducting walls (9) which form a tube that is square in cross-section; two conducting elements (12) that are placed at separate points in the vertex of one angle; and contains mercury (15), freezable liquid (14) and an air expansion space (11). The modified mercury switch freezer alarm sensor can also be used as a sensor component of home burglar alarm systems which are activated by breaking a closed electrical circuit.

3 Claims, 5 Drawing Sheets

FREEZER ALARM SYSTEM WITH TWO SENSOR MODELS

BACKGROUND — FIELD OF THE INVENTION

This invention relates to freezer alarm systems and freezer alarm system sensors for detection of prolonged elevation of temperature above the freezing point in home food freezer compartments.

BACKGROUND — PROBLEM ADDRESSED BY THE INVENTION

All home freezer systems eventually fail. Also, temporary freezer failures can occur due to failure of the electrical power supply to the home or to the particular circuit that supplies electrical power to the freezer unit. A generalized power outage is readily apparent from lack of lights and failure of other electrical appliances. A restored power outage is also apparent by observing clocks in the house. However, failure of the circuit suppling the freezer or failure of the freezer itself can easily go unnoticed for two or three days, at which time the foul odor of the deteriorating contents will be detected too late to move the contents to another freezer and prevent their loss. The cost of currently available freezer alarm systems has prevented their widespread use in home freezers, so that most home freezers are not currently protected by a freezer alarm system. This invention addresses this problem via one of two approaches. The first is an inexpensive stand-alone freezer alarm system using an electrolyte freezer alarm sensor. The second is a modified mercury switch freezer alarm sensor to be used as a component of home burglar alarm systems. Most burglar alarm systems require a freezer sensor that maintains a closed electrical circuit while the temperature range is safe and allows the circuit to open when the temperature rises above freezing. The modified mercury switch freezer alarm sensor revealed in this invention can be used in a manner to satisfy this requirement.

BACKGROUND — DISCUSSION OF PRIOR ART

Heretofore, freezer alarm sensors have experienced a variety of technical problems. Those based around a thermostat or direct temperature measurement device suffered the disadvantage of annoying false alarms when the freezer compartment was opened to remove or add foods. The sensors in U.S. Pat. No. 4,144,532 to Boyd, 1979 Mar. 13 and in U.S. Pat. No. 4,325,059 to Jaye, 1982, April 13 improved the situation by including a liquid component that when frozen would prevent a conductive member from falling by gravity to bridge electrical contacts. Thus, temperature elevation for sufficient time to thaw the liquid was required to trigger the alarm, and false alarms were minimized. However, both patent U.S. Pat. No. 4,144,532 and U.S. Pat. No. 4,325,059 have fairly precise construction specifications which make them relatively expensive to construct, and they require a specific orientation during the freezing of the liquid component and a different specific orientation when being used to detect a freezer failure. Thus, U.S. Pat. Nos. 4,144,532 and 4,325,059 are somewhat more subject to user error related failure when compared to a device that can be placed in the compartment in any position and would be unaffected by accidental changes in position while adding food to the freezer or removing food from the freezer. A combination of the above factors, especially cost of manufacture, may explain why very few home freezers are currently protected by alarm systems even though it is self apparent that all home freezers will eventually fail.

Conduction of electricity by a electrolyte solution is a well known phenomenon. Devices which take advantage of this knowledge include the tilt switch in U.S. Pat. No. 2,387,313 to Wilson, 1945, Oct. 23 and a refrigerator safety device in U.S. Pat. No. 2,067,440 to Finney, 1937, Jan. 12. The tilt switch in U.S. Pat. No. 2,387,311 to Wilson, 1945, Oct. 23 also used ethanol mixtures with electrolyte solutions as a means of modifying the freezing point of the electrolyte solution. The fire alarm circuit in U.S. Pat. No. 856,162 to Kitsee, 1907, June 4 also recognized that some compounds such as hydrated potassium can when melted act in the same manner as electrolyte solution in a generator of electricity. However, none of these devices were designed for detection of freezer failure and none would operate as described to serve as a means of detecting a increase in freezer compartment temperature above the freezing point of the freezer contents. The freezer alarm system in U.S. Pat. No. 2,433,024 to Burgess, 1947, Dec. 23 included an electrolyte solution as a means of activating the cells of a deferred action electric battery and thus acting as a generator of electricity. None of the above devices employed the knowledge that freezing of the solvent prevents flow of the solute electrolyte and thus electrical current, which is the basis for operation of the electrolyte freezer alarm sensor disclosed in this application. For example, the device in U.S. Pat. No. 2,433,024 to Burgess, 1947, Dec. 23 employed an envelope composed of frangible material to prevent electrolyte from contacting electrode elements prior to melting of the electrolyte solution.

Mercury switchs are a well known means of controlling an electrical circuit. The invention of U.S. Pat. No. 3,626,128 to DuRocher, 1971, Dec. 7 included liquid ether to help dissipate the heat generated by the electrical resistance of mercury and to enable the switch to function over a wide temperature range. The switch described in U.S. Pat. No. 3,626,128 would not function as a freezer alarm sensor because it was specifically designed to prevent freezing of the non-mercury liquid phase at conventional freezer temperatures. My modified mercury switch freezer alarm sensor uses the freezability of a liquid, which others have considered a dissadvantage, as the key operational feature of this invention.

The use of conductor material to conveniently and remotely locate components of an electrical circuit is a longstanding and widespread practice. It is commonly used in sterio sound equipment, burgular alarm systems, and many other applications. Conductor material has been used to connect the sensor component to other components of all freezer alarm systems proposed to date, including those in U.S. Pat. No. 2,433,024 to burgess, 1947, Dec. 23, U.S. Pat. No. 3,959,787 to Messmann, 1976, May 25, U.S. Pat. No. 4,011,552 to Quirke, 1977, Mar. 8, U.S. Pat. No. 4,144,532 to Boyd, 1979, Mar. 13, U.S. Pat. No. 4,325,059 to Jaye, 1982, April 13, and U.S. Pat. No. 4,855,721 to Hallett, 1989, Aug. 8. Conductor material is also used to connect components of the freezer alarm sensors disclosed in this application. Remote location is an obvious function of the length of conductor material used.

OBJECTS AND ADVANTAGES

Accordingly, several objects and advantages of my invention are:

(a) to provide a simple low cost system for detection of freezer overtemperature;

(b) to provide an overtemperature detection system that can be readily installed in an existing freezer compartment;

(c) to provide an electrolyte freezer alarm sensor that is simple and economical to construct;

(d) to provide an electrolyte freezer alarm sensor that is not subject to false alarms due to transient elevation of freezer compartment temperature;

(e) to provide an electrolyte freezer alarm sensor that does not require a specific orientation at the time of freezer overtemperature in order to be functional;

(f) to provide an electrolyte freezer alarm sensor that can be modified to respond at variable degrees of overtemperature by varying the chemical composition of the electrolyte solution;

(g) to provide a modified mercury switch freezer alarm sensor that can be used in combination with a burglar alarm system to detect freezer overtemperature;

(h) to provide a modified mercury switch freezer alarm sensor that will maintain a closed electrical circuit while freezer temperature is below the freezing point of a given freezable liquid;

(i) to provide a modified mercury switch freezer alarm sensor that is not subject to false alarms due to transient elevation of freezer compartment temperature;

(j) to provide a modified mercury switch freezer alarm sensor constructed in such a manner that when frozen it will result in an ice block that is shaped to prevent movement away from the trapped mercury layer and still allow for an air expansion space; and (k) to provide a modified mercury switch freezer alarm sensor that can be modified to respond at variable degrees of overtemperature by varying the chemical composition of the freezable liquid.

Further objects and advantages of my invention will become apparent from a consideration of the drawings and ensuing description of it.

DRAWING FIGURES

DESCRIPTION OF THE PREFERRED EMBODIMENTS

Figure 1:
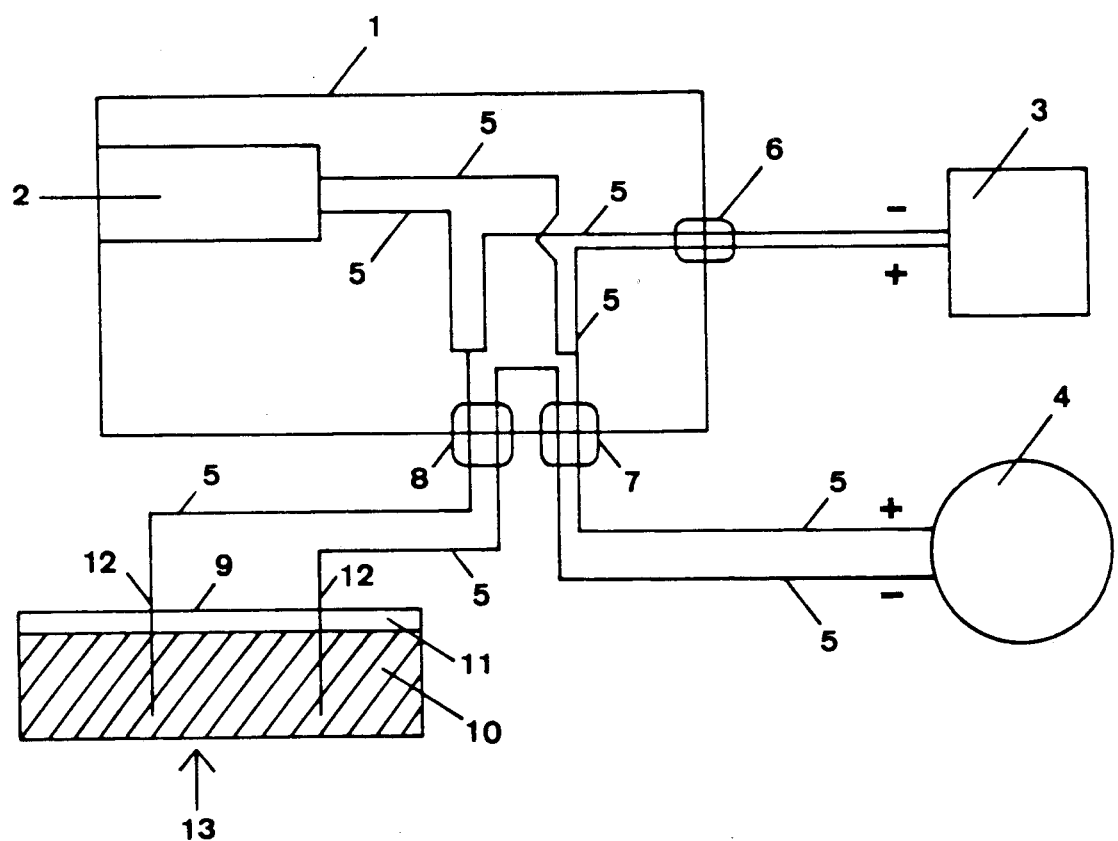
FIG. 1 shows a top view of the components of the freezer alarm system, including the electrolyte freezer alarm sensor.

A typical embodiment of the freezer alarm system using the electrolyte freezer alarm sensor 13 is illustrated in FIG. 1. A plastic experimenter box 1 with dimensions of 4 ×2.2 ×1.5 inches is used to mount a 9 volt battery 2, a coaxial DC power jack 6, an alarm RCA jack 7, and a sensor RCA phono jack 8. A 9 volt battery holder is used to attach the battery to the experimenter box. A snap-on 9 volt battery clip is attached to the battery posts. Insulated conducting material 5 from both the positive terminal of the 9 volt battery 2 and the positive terminal of coaxial DC power jack 6 are attached to the terminal on the alarm RCA phono jack 7, which leads to the positive terminal of the piezo alert pulsing buzzer 4. Insulated conducting material 5 from both the negative terminal of the 9 volt battery 2 and the negative terminal of the coaxial DC power jack 6 are attached to one of the terminals on the sensor RCA phono jack 8. The other terminal from the sensor RCA phono jack 8 is attached by insulated conducting material to the terminal on the alarm RCA phono jack 7 leading to the negative terminal of the piezo alert pulsing buzzer 4. The DC plug from the AC adapter 3 is plugged into the coaxial DC power jack 6.

A typical embodiment of the electrolyte freezer alarm sensor 13 is included in FIG. 1. The container has non-conducting walls 9. A small plastic test tube can be used as the container. The container has two conducting elements 12 which are placed at separate positions in the wall of the container. The conducting elements 12 extend through the non-conducting wall 9 into the interior of the container. The container is filled with electrolyte solution 10, except for a small air expansion space 11. A solution of approximately 0.5 percent sodium chloride can be used as the electrolyte solution 10. A wetting agent such as a household detergent can be included in the electrolyte solution 10 to reduce surface tension. Insulated conducting material 5 extends from each conducting element 12 to one pole of the sensor RCA phono jack 8.

Figure 2:
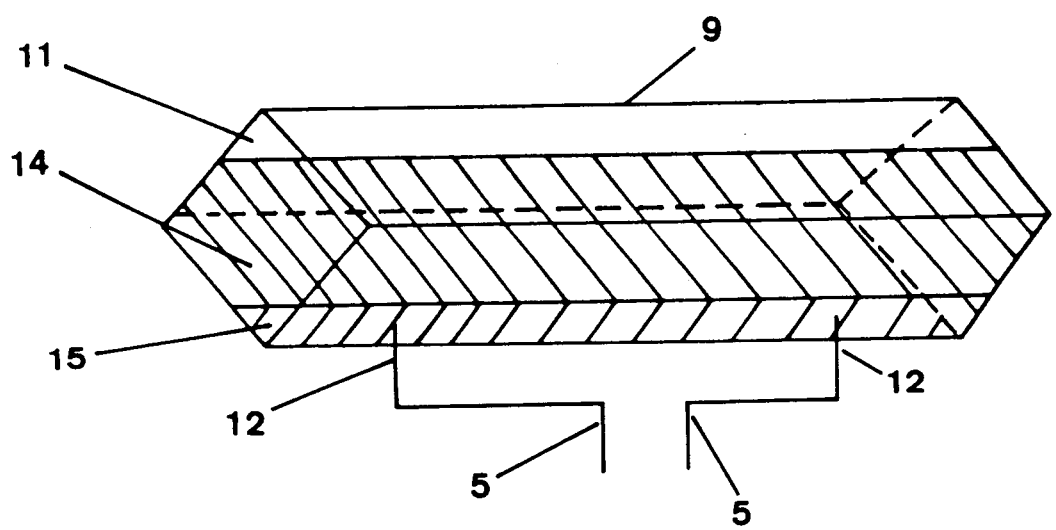
FIG. 2 shows a perspective drawing of a modified mercury switch freezer alarm sensor in the horizontal position.
Figure 3:
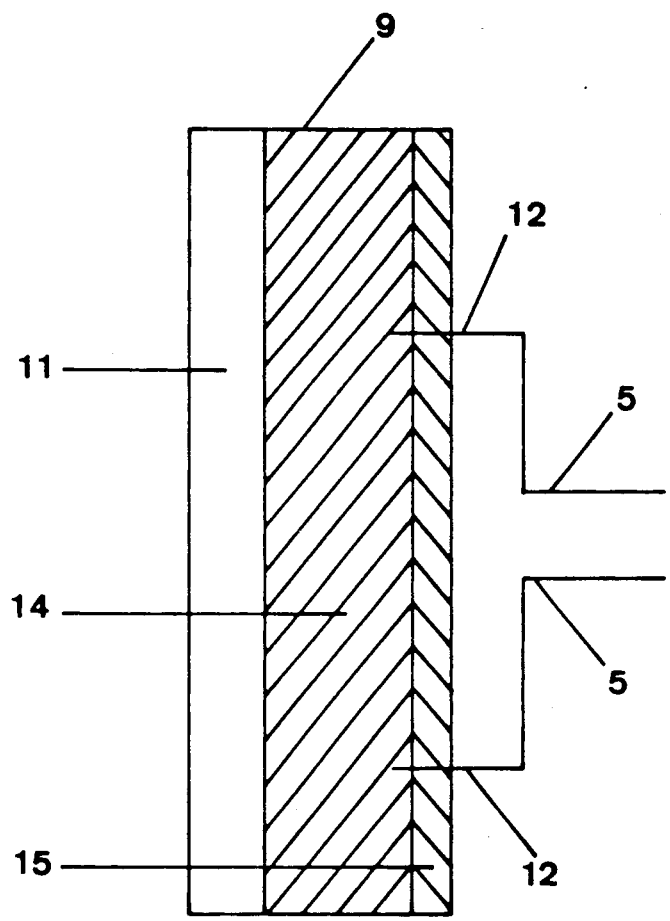
FIG. 3 shows a side view of a modified mercury switch freezer alarm sensor as it appears when changed to the vertical position after being frozen while in the horizontal position.
Figure 4:
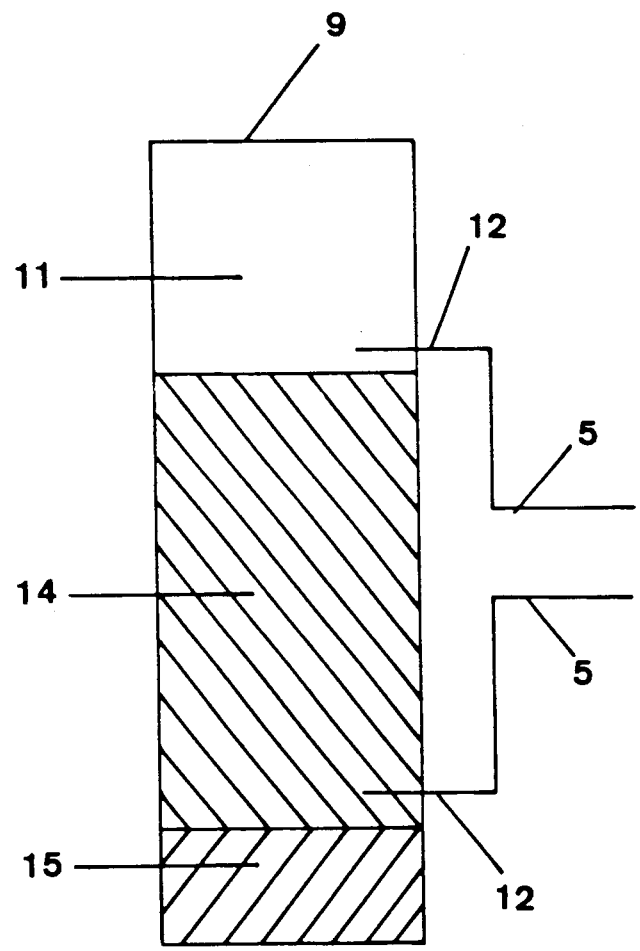
FIG. 4 shows a side view of a modified mercury switch freezer sensor in the vertical position as it appears in the thawed state.
Figure 5:
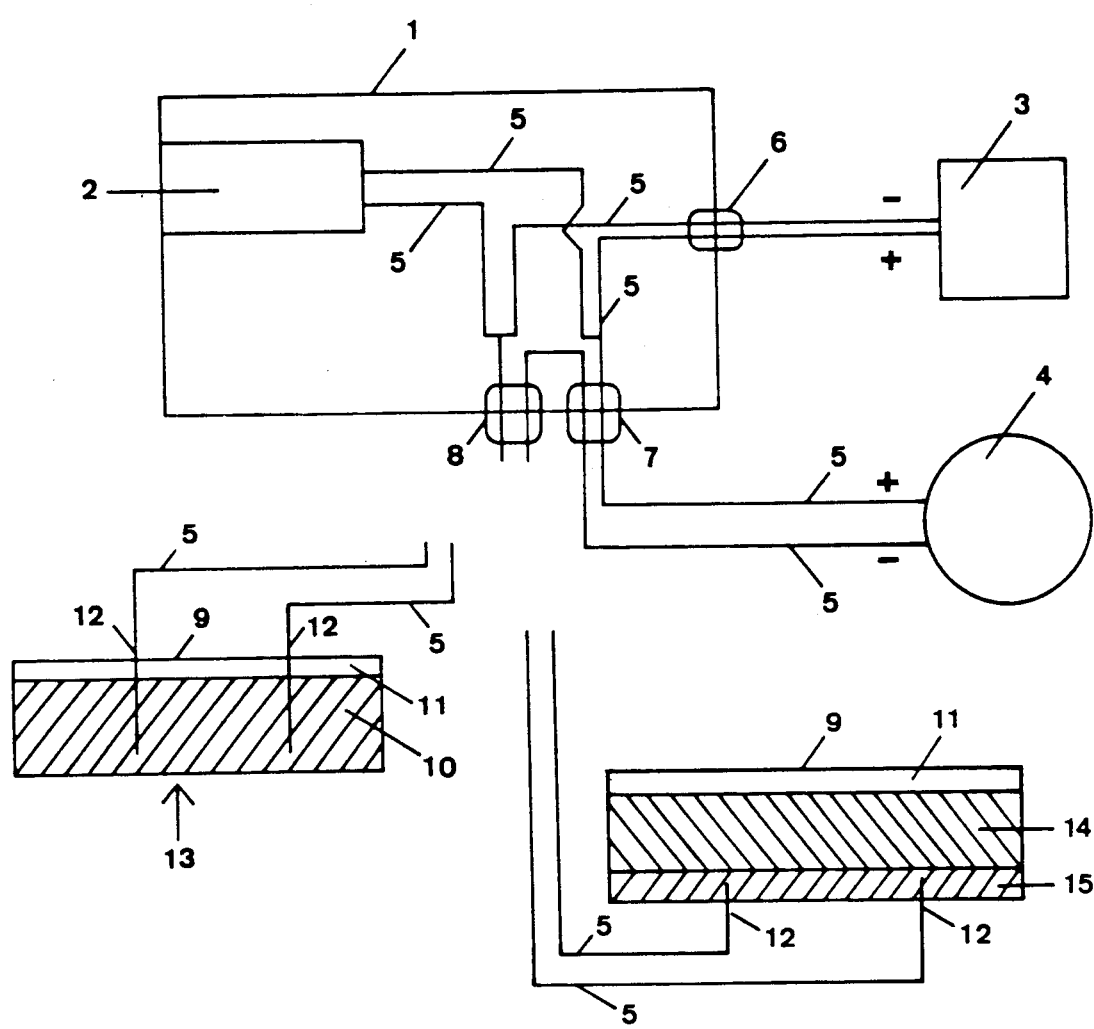
FIG. 5 shows a diagramatic view of a typical alarm circuit including illustrations of both sensor modules proposed in this application.

A typical embodiment of the modified mercury switch freezer alarm sensor is illustrated in FIGS. 2, 3 and 4. The modified mercury switch freezer alarm sensor can be constructed from a piece of square tubing made of non-conducting material such as acrylic plastic. FIG. 2 is a perspective view of the modified mercury switch freezer alarm sensor in the horizontal position with the vertex of one angle down. Two conducting elements 12 can be placed in the vertex of the bottom angle at points separated from each other by the non-conducting wall 9. The volume of mercury 15, the volume of freezable liquid 14, and the position of the two conducting elements 12 can be varied to satisfy the conditions illustrated in FIGS. 2 and 4. The volume of mercury 15 must be sufficient to fill the vertex of one angle while in the horizontal position illustrated in FIG. 2, but not enough to contact both conducting elements 12 when in the vertical position illustrated in FIG. 4. The volume of freezable liquid 14 must be sufficient to fill the tube above the level of the two lateral angles when in the horizontal position illustrated in FIG. 2, but not enough to contact the upper conducting element 12 when in the vertical position illustrated in FIG. 4. The ends of the square tubing can be sealed with plugs of a suitable adhesive material that cures to a firm state and maintains a seal when frozen. FIG. 3 is a side view of FIG. 2 as it would appear when changed to the vertical position after being frozen while in the horizontal position.

OPERATION

The battery 2, AC adapter 3, and piezo alert pulsing buzzer 4, while wired as illustrated in FIG. 1, can be used with either the electrolyte freezer alarm sensor 13 or the modified mercury switch freezer alarm sensor illustrated in FIGS. 2,3 and 4. When used as a stand-alone system, the electrolytic freezer alarm sensor is the preferred embodiment. The length of the insulated conducting material 5 to both the electrolyte freezer alarm sensor 13 and the piezo alert pulsing buzzer 4 can be varied to meet the following requirements. The piezo alert pulsing buzzer 4 is located in an area that is frequently occupied; the electrolyte freezer alarm sensor 13 is located in the freezer compartment; and the AC adapter 3 is plugged into an electrical circuit that is separate from that supplying the freezer unit. Phono plug extensions are inexpensive and readily available, and thus can be used to position the system components as desired in a particular house.

The electrolyte freezer alarm sensor is placed in the freezer and allowed to freeze prior to plugging the phono plug into the sensor RCA phono jack 8. Direct current is supplied from the battery 2 and the AC adapter 3 to the piezo alert pulsing buzzer 4. However, current cannot flow while the solvent of the electrolyte solution 10 is in the frozen state. When an overtemperature condition persists long enough to thaw the solvent of the electrolyte solution 10, electrical current will flow through the system, including the piezo alert pulsing buzzer 4, and the alarm will sound. The alarm will continue to sound as long as a current is supplied by either the battery 2 or the AC adapter 3 power supply.

The modified mercury switch freezer alarm sensor can also be used with the alarm system illustrated in Fig 1. Place the sensor in the freezer compartment in the vertical position illustrated in FIG. 4 and allow the freezable liquid 14 to freeze. Then rotate the modified mercury switch freezer alarm sensor to the horizontal position and plug the sensor phono plug into the sensor RCA phono jack 8. Current will not flow until overtemperature conditions persist long enough to melt the ice plug and permit the mercury 15 and freezable liquid 14 to assume the positions illustrated in FIG. 2.

The modified mercury switch freezer alarm sensor can also be used as a component of a home burglar alarm system of the type requiring that a circuit potential be maintained to prevent an alarm from sounding. This mode of operation is accomplished by placing the modified mercury switch sensor in the freezer compartment in the horizontal position illustrated in FIG. 2 and allowing the freezable liquid 14 to freeze. Then rotate the sensor to the vertical position illustrated in FIG. 3, and plug the sensor into the home burglar alarm system. The circuit will be maintained until an overtemperature condition persists long enough to permit the freezable liquid 14 to melt. The mercury 15 and freezable liquid 14 will then assume the positions illustrated in FIG. 4, the circuit will break, and the alarm will sound in whatever manner provided for by the features of the home burglar alarm system.

SUMMARY, RAMIFICATIONS, AND SCOPE

Accordingly, the reader will see that the freezer alarm system revealed in this invention provides a number of distinct advantages and benefits in that:

it is inexpensive and simple to assemble;

it does not produce false alarms from defrost cycles or temporary elevation of temperature when the freezer is opened to add or remove food;

it can be easily installed in an existing freezer;

the electrolyte freezer alarm sensor does not require a specific orientation in the freezer compartment to be functional, and is thus less prone to failure than models revealed in the prior art;

the modified mercury switch sensor permits the user to gain access to a wide range of sophisticated features that have been developed for home burglar alarm systems.

Although the description above contains many specificities, these should not be construed as limiting the scope of the invention but as merely providing illustrations of some of the presently preferred embodiments of this invention. Thus, the scope of the invention should be determined by the appended claims and their legal equivalents, rather than by the examples given.

I claim:

1. A freezer alarm sensor for connecting an electrically operated alarm device in an energizing circuit in response to existence of a deleterious condition, comprising:
   a. a container with non-conducting walls,
   b. electrolyte solution in said container,
   c. an expansion space in said container,
   d. means of conducting electricity extending from outside said container into said electrolyte at two spacially separated points on said non-conducting walls, whereby when said electrolyte is frozen, the current is inactive but when said electrolyte melts, the alarm device is energized via said circuit.

2. A freezer alarm sensor for connecting an electrically operated piezo alert pulsing buzzer alarm device in an energizing circuit in response to existence of a deleterious condition, comprising:
   a. a container with non-conducting walls,
   b. electrolyte solution in said container,
   c. an expansion space in said container,
   d. means of conducting electricity extending from outside said container into said electrolyte at two spacially separated points on said non-conducting walls, whereby when said electrolyte is frozen, the circuit is inactive but when said electrolyte melts, the alarm device is energized via said circuit.

3. A freezer alarm sensor for connecting an electrically operated piezo alert pulsing buzzer alarm device in an energizing circuit in response to existence of a deleterious condition, comprising:
   a. a container with non-conducting walls, and having at least three angled edges,
   b. means of conducting electricity extending from outside to inside said container at two spacially separated points in the vertex of one angled edge,
   c. sufficient mercury in said container to bridge said means of conducting electricity when said sensor is in the horizontal position with said means of conducting electricity in the most downward position, and
   d. sufficient freezable liquid in said container to fill said container to a level above two of said angled edges when said container is in said horizontal position.

* * * * *